(12) United States Patent
Domjan et al.

(10) Patent No.: US 6,989,935 B2
(45) Date of Patent: Jan. 24, 2006

(54) OPTICAL ARRANGEMENTS FOR HEAD MOUNTED DISPLAYS (75) Inventors: László Domjan, Budapest (HU); Gábor Szarvas, Budapest (HU); Szabolcs Mike, Érd (HU)

(73) Assignee: Headplay, Inc., Calgary (CA)

( * ) Notice: Subject to any disclaimer, the term of this patent is extended or adjusted under 35 U.S.C. 154(b) by 26 days.

(21) Appl. No.: 10/715,911

(22) Filed: Nov. 18, 2003

(65) Prior Publication Data

US 2004/0150884 A1 Aug. 5, 2004

(30) Foreign Application Priority Data

Nov. 19, 2002 (HU) .............................. 0203993

(51) Int. Cl.
G02B 27/14 (2006.01)
G09G 5/00 (2006.01)

(52) U.S. Cl. ................ 359/630; 359/618; 359/619; 359/633; 359/638; 345/8; 345/9; 345/86; 348/53; 353/31

(58) Field of Classification Search ............... 359/630, 359/631, 633, 618, 619, 638, 641; 345/8, 345/9, 7, 15, 86; 348/42, 53, 54, 59; 353/31
See application file for complete search history.

(56) References Cited

U.S. PATENT DOCUMENTS

| 2,949,808 | A | * | 8/1960 | Thurow ................. 356/29 |
| 4,575,722 | A | * | 3/1986 | Anderson ............... 345/86 |
| 5,035,474 | A | | 7/1991 | Moss et al. |
| 5,129,716 | A | | 7/1992 | Holakovszky et al. |
| 5,392,158 | A | | 2/1995 | Tosaki |
| 5,682,173 | A | | 10/1997 | Holakovszky et al. |
| 5,739,955 | A | | 4/1998 | Marshall |
| 5,926,318 | A | | 7/1999 | Hebert |
| 6,055,109 | A | | 4/2000 | Hur |
| 6,094,309 | A | | 7/2000 | Ophey |
| 6,219,186 | B1 | | 4/2001 | Hebert |
| 6,246,383 | B1 | | 6/2001 | Ophey |
| 6,246,386 | B1 | | 6/2001 | Perner |
| 6,271,808 | B1 | | 8/2001 | Corbin |
| 6,501,602 | B2 | * | 12/2002 | Togino et al. .......... 359/631 |
| 6,724,353 | B2 | * | 4/2004 | Ophey .................... 345/8 |
| 6,795,042 | B1 | * | 9/2004 | Nagata et al. ........... 345/8 |
| 2002/0000951 | A1 | | 1/2002 | Richards |
| 2002/0080496 | A1 | | 6/2002 | Kaschke et al. |

FOREIGN PATENT DOCUMENTS

| EP | 0 252 200 | 1/1988 |
| HU | 212 134 A | 6/1998 |
| HU | 216 221 B | 5/1999 |
| JP | 06-110014 | 4/1994 |
| JP | 10-148789 | 6/1998 |
| JP | 11-295645 | 10/1999 |
| WO | WO 85/04961 | 11/1985 |
| WO | WO 99/31543 | 6/1999 |
| WO | WO 00/00119 | 1/2000 |
| WO | WO 01/59507 | 8/2001 |

OTHER PUBLICATIONS

PCT Search Report issued for PCT/US 03/39768, dated Apr. 21, 2004.
International Search Report Issued for PCT/US/ 03/39756, dated May 19, 2004.
Hungarian Search Report Issued for P0203993, dated Apr. 29, 2004.

* cited by examiner

Primary Examiner—Loha Ben
(74) Attorney, Agent, or Firm—Fulbright & Jaworski LLP (57) ABSTRACT A head mounted display is disclosed that utilizes a single video display screen to transport images to both eyes. The image of this display screen is focused in order to reduce the splitting volume and then split by a plurality of reflective surfaces located near the focal point of the image.

61 Claims, 9 Drawing Sheets

OPTICAL ARRANGEMENTS FOR HEAD MOUNTED DISPLAYS

CROSS-REFERENCE TO RELATED APPLICATIONS

The present application is related to concurrently filed, co-pending, and commonly assigned U.S. patent application Ser. No. 10/716,192, entitled "MULTIPLE IMAGING ARRANGEMENTS FOR HEAD MOUNTED DISPLAYS," the disclosure of which is hereby incorporated herein by reference.

PRIORITY

The present application claims priority to Hungarian Patent Application, Serial No. P 02 03993, Filed, Nov. 19, 2002, entitled "OPTICAL SYSTEM FOR A BINOCULAR VIDEO SPECTACLE," the disclosure of which is hereby incorporated herein by reference.

TECHNICAL FIELD

The invention relates generally to visual displays and more specifically to optical arrangements for head mounted systems that use a single display.

BACKGROUND OF THE INVENTION

Head Mounted Displays (HMDs) are a class of image display devices that can be used to display images from television, digital versatile discs (DVDs), computer applications, game consoles, or other similar applications. A HMD can be monocular (a single image viewed by one eye), biocular (a single image viewed by both eyes), or binocular (a different image viewed by each eye). Further, the image projected to the eye(s) may be viewed by the user as complete, or as superimposed on the user's view of the outside world. HMD designs must account for parameters such as image resolution, the distance of the virtual image from the eye, the size of the virtual image (or the angle of the virtual image), the distortions of the virtual image, the distance between the left and the right pupil of the user (inter pupillar distance (IPD)), diopter correction, loss of light from image splitting and transmission, power consumption, weight, and price. Ideally, a single HMD would account for these parameters over a variety of users and be able to display an image regardless of whether it was a stereo binocular image or a simple monoscopic image.

If the resolution of a picture on the HMD's internal display is 800×600 pixels, an acceptable size for the virtual image produced by the HMD's optics is a virtual image diameter of approximately 1.5m (52"–56") at 2m distance which corresponds to approximately a 36° angle of view. To properly conform to the human head and eyes, the IPD should be variable between 45 mm and 75 mm. In order to compensate for near- and farsightedness, at least a ±3 diopter correction is necessary.

The use of only one microdisplay in the HMD (instead of using one for each eye) drastically reduces the price of the device. Typically, an arrangement for such a unit positions a microdisplay between the user's eyes. The image produced is then split, enlarged, and separately transmitted to each eye. There are numerous designs known in the art for beam splitting in single display HMDs with a center mounted display, but none are known that provide a solution that is cheap, light weight, small in size, and capable of displaying all varieties of images.

BRIEF SUMMARY OF THE INVENTION

Embodiments of the present invention reduce the splitting volume of head mounted displays by focusing the image produced by a single display screen and splitting that image near its focal point. The separate sub-images are then focused and propagated through a plurality of optical sub-paths delivering the image to separate locations.

Some embodiments utilize an asymmetrical V-mirror splitter which can consist of a partially reflective surface and a fully reflective surface placed near the focal point of the image. A portion of the light containing the image information is then reflected by the partially reflective surface and can be channeled to one eye, while the remaining portion of the light is reflected by the fully reflective surface and channeled to the other eye.

Some embodiments may also utilize diffusers onto which real images of the display are formed. Real images are projected onto diffusers by transition optics having a small numerical aperture, and transmitted to a viewer's eyes by optics having a larger numerical aperture.

Some embodiments may also utilize rotating reflectors. By reflecting the split images off of multiple reflectors, the path of these images can be altered in a manner that allows the embodiments to adjust for the inter pupillar distances of different users. Other embodiments utilize the synchronized movement of multiple optical blocks to adjust for the interpupillary distance of different users.

Further embodiments may also utilize a light source to illuminate the display. One possible arrangement may include individual sources of narrow wavelength light arranged to approximate a single wide band source.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
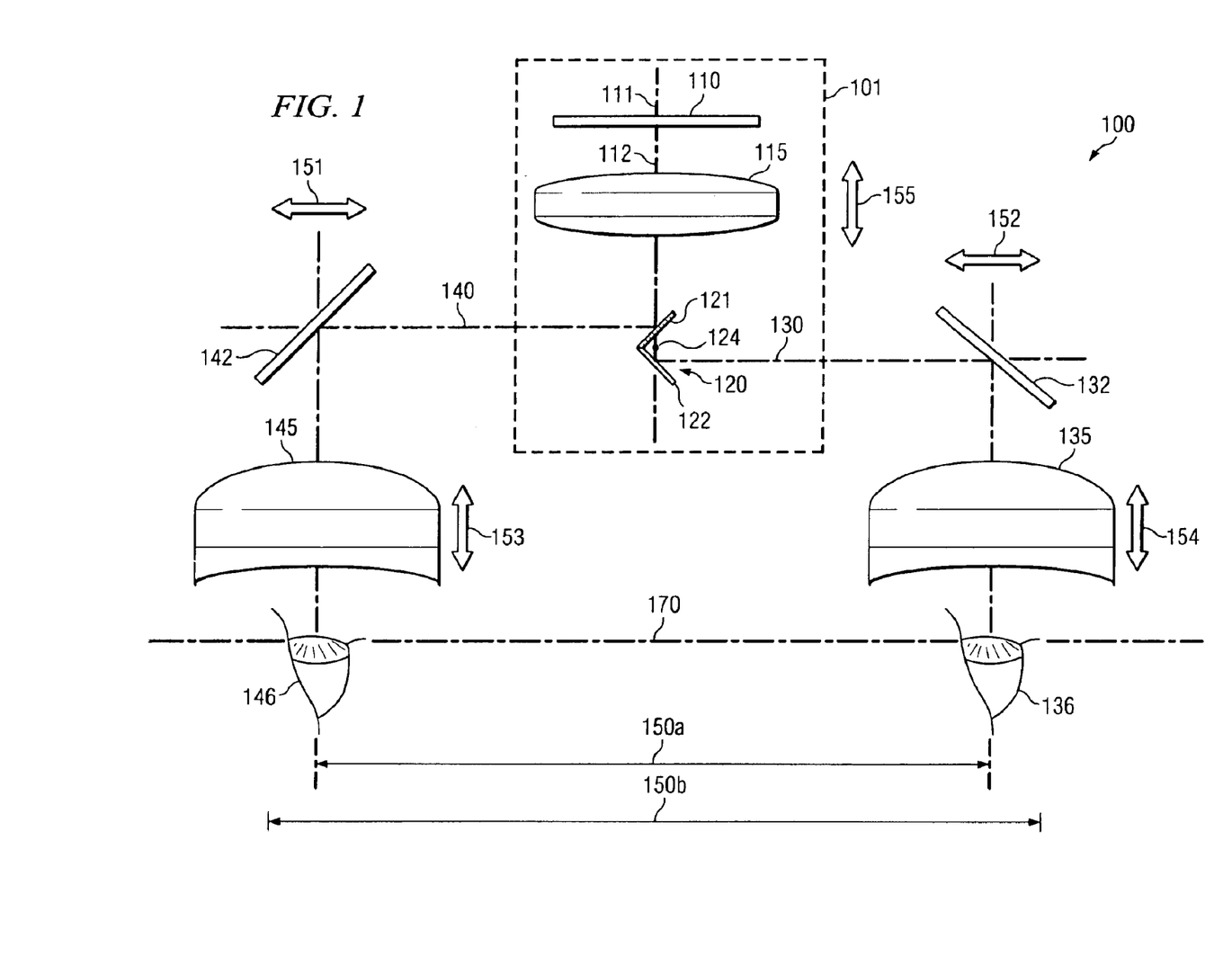
FIG. 1 illustrates a top view of a head mounted display arranged according to an embodiment of the present invention.

FIG. 1 illustrates a top view of head mounted device 100 arranged according to an embodiment of the present invention. Sub-image creation section 101, within device 100, creates a plurality of sub-images from a single image source into a plurality of optical sub-paths. Display 10 can be any suitable apparatus or screen operable to display a visual image of data, such as a liquid crystal display (LCD) screen. Display 10 is situated along a display axis 111, which, in the embodiment shown, is normal to the screen of display 110 and perpendicular to facial plane 170 of a user. Display 110 is designed to project a display image along optical path 112. In the arrangement of section 101, optical path 112 lies along display axis 111. Display lens 115 is located along, and perpendicular to, optical path 112, and has display lens focal point 124. Display lens focal point 124 lies on optical path 112, and section 101 is arranged such that display lens focal point 124 lies within splitter 120. By focusing the display image before it is split, the splitting of volume of sub-image creation section 101 can be greatly reduced. A small splitting volume allows an embodiment to use small, light-weight splitting elements and allows HMD designs to include advantageous arrangements and additional optical elements that improve image quality and can increase the size of the image viewed by a user. The embodiment of FIG. 1 is arranged to produce an image through (approximately) collimated light emanated by (or being reflected from) display 110, thus splitter 120 is placed proximate to display lens focal point 124. The embodiments are not limited to this arrangement however, as splitter 120 should be arranged in the position most appropriate to the focused image. For example, if display 110 emits, transmits, or reflects non collimated light, the display image will be focused to a "point" that is not display lens focal point 124, and embodiments will arrange splitter 120 in a position proximate to this focal area.

In embodiments using the arrangement of section 101, splitter 120 is an asymmetric V-mirror splitter composed of a partially reflective surface 121 and a fully reflective surface 122. The proximity of surfaces 121, 122 will be dependent upon the size of splitter 120 and the amount of splitter volume reduction section 101 is arranged to produce. Section 101 is further arranged so that surface 121 and surface 122 share a common edge, and are arranged asymmetrically about display axis 111. Section 101 can thus split a display image of display 110 into two separate display sub-images. The term sub-image is used to describe the multiple images of a display created by the various embodiments of the present invention. The sub-images of FIG. 1 contain all of the information of a display, but embodiments may use sub-images that contain only a portion of an image.

Upon striking partially reflective surface 121, a portion of a display image is reflected along left-eye optical sub-path 140, and becomes a left-eye sub-image. The portion of a display image not reflected by partially reflective surface 121 passes through and strikes fully reflective surface 122, becoming a right-eye sub-image, which is reflected along right-eye optical sub-path 130. The result is an identical left-eye sub-image and right-eye sub-image traveling in opposite directions and containing identical image information.

Left-eye sub-image will follow optical sub-path 140 and be channeled to left eye 146 of a user. Placed along optical sub-path 140 is left-eye reflector 142, which is a fully reflective surface arranged to redirect left-eye optical sub-path 140 by 90 degrees and into left eyepiece optics 145. The right-eye sub-image will follow optical sub-path 130 and be channeled to right eye 136 of a user. Placed along optical sub-path 130 is right-eye reflector 132, which is a fully reflective surface arranged to redirect right-eye optical sub-path 130 by 90° and into right eyepiece optics 135. Right eyepiece optics 135 and left eyepiece optics 145 can be a single lens or a combination of several lenses designed to appropriately magnify a right-eye sub-image for viewing by right eye 136 of the user and a left-eye sub-image for viewing by left eye 146 of the user, respectively.

Eyepiece optics 135 and 145 are adjustable single lenses, but other embodiments may use multiple lenses or any other arrangement that appropriately focuses a right-eye sub-image and a left-eye sub-image for viewing by right eye 136 and left eye 146, respectively. Further, although reflectors 142, 132 of device 100 are depicted as mirrors, embodiments are not limited to the use of mirrors for redirecting an optical sub-path. Rather, prisms, partially reflective surfaces, polarizing beam splitters, or any other suitable arrangements can be used for redirecting an optical sub-path.

Device 100 is also capable of adjusting for the varying IPDs of different users through the synchronized movements of optical elements. Right eyepiece optics 135 and left eyepiece optics 145 can shift through movements 152 and 151 respectively to create IPD 150a and IPD 150b, when section 101 shifts through movement 155. When IPD distance 150a is changed to IPD 150b, section 101 is simultaneously shifted toward facial plane 170 in movement 155 (downwards in the view of FIG. 1). When IPD 150b is changed to 150a, section 101 is simultaneously shifted away from plane 170 (upwards in the view of FIG. 1). These synchronized movements allow device 100 to adjust to accommodate for the entire range between IPD 150a and 150b while maintaining constant distances between surfaces 122, 121 and eyepiece optics 135, 145 along sub-paths 130 and 140, respectively. Device 100 is also capable of diopter correction through additional adjustments of movement 153 of left eyepiece optics 145 and movement 154 of right eyepiece optics 135.

Figure 2:
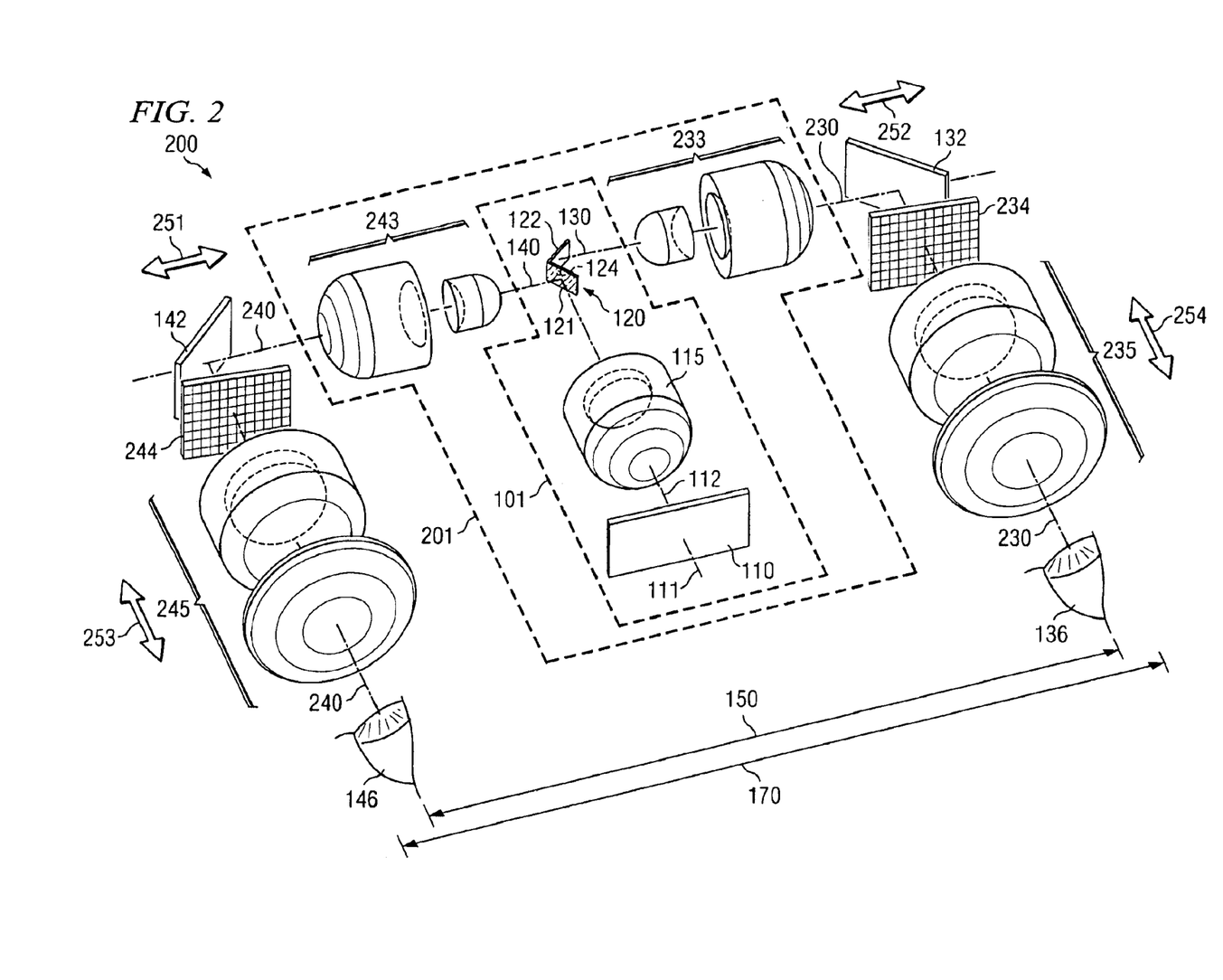
FIG. 2 illustrates a prospective view of a head mounted display arranged according to an embodiment of the present invention.

FIG. 2 illustrates a prospective view of head mounted device 200 arranged according to an embodiment of the present invention. Head mounted device 200 includes section 101, as described in relation to FIG. 1, which operates to split a display image of display 110 into a left-eye sub-image traveling along left-eye optical sub-path 140 and a right-eye sub-image traveling along right-eye optical sub-path 130. For device 200, left-eye transition optics 243 are placed along left-eye optical sub-path 140 to adjust the left-eye sub-image for reflection by left-eye reflector 142 onto left-eye diffuser 244. The left-eye sub-image strikes the left-eye diffuser 244 and creates a real image of the display on the diffuser surface. The left eyepiece compound optics 245 then magnifies this real image appropriately for left eye 146.

The embodiment depicted in FIG. 2 is described using diffusers onto which real images are projected in order to prepare the image. Transition optics, having a small numerical aperture, project a real image onto the diffuser surface, and eyepiece optics having a large numerical aperture transport the image to the eyes of a user. Rather, any appropriate means may be used including microlens arrays, diffraction gratings, or other diffractive surfaces. For the purposes of the present invention, it will be understood that "diffuser" as used to describe the embodiments of the present invention, refers to all such means used to convert incident angular power density into an appropriate exiting angular power density.

In FIG. 2, a right-eye sub-image follows the right-eye optical sub-path 130 into right eye transition optics 233. The right eye transition optics 233 adjusts the right-eye display sub-image appropriately for reflection by right-eye reflector 132 onto right-eye diffuser 234. The right-eye sub-image strikes right-eye diffuser 234 and creates a real image. This real image is adjusted by right eyepiece compound optics 235 appropriately for right eye 136. Device 200 is capable of diopter correction through movement 253 of left-eye compound optics 245 and of movement 254 of right-eye compound optics 235.

Device 200 is also capable of IPD adjustment through multiple synchronous movements. IPD 150 can be shortened by shifting left-eye compound optics 234 to the right with movement 251, and right-eye compound optics 235 to the left with movement 252. For the embodiment of FIG. 2, segment 240 of optical sub-path 140 lies between transition optics 243 and diffuser 244, and segment 230 of optical sub-path 130 lies between transition optics 233 and diffuser 234. Thus, as compound optics 235 and 245 are shifted in movement 252 and 251 to shorten distance 150, center section 201 should be shifted away from the facial plane 170. The embodiment of FIG. 2 describes one combination of synchronous movements that result in IPD adjustment, but embodiments of the present invention are not limited to the synchronous movements of FIG. 2.

Figure 3:
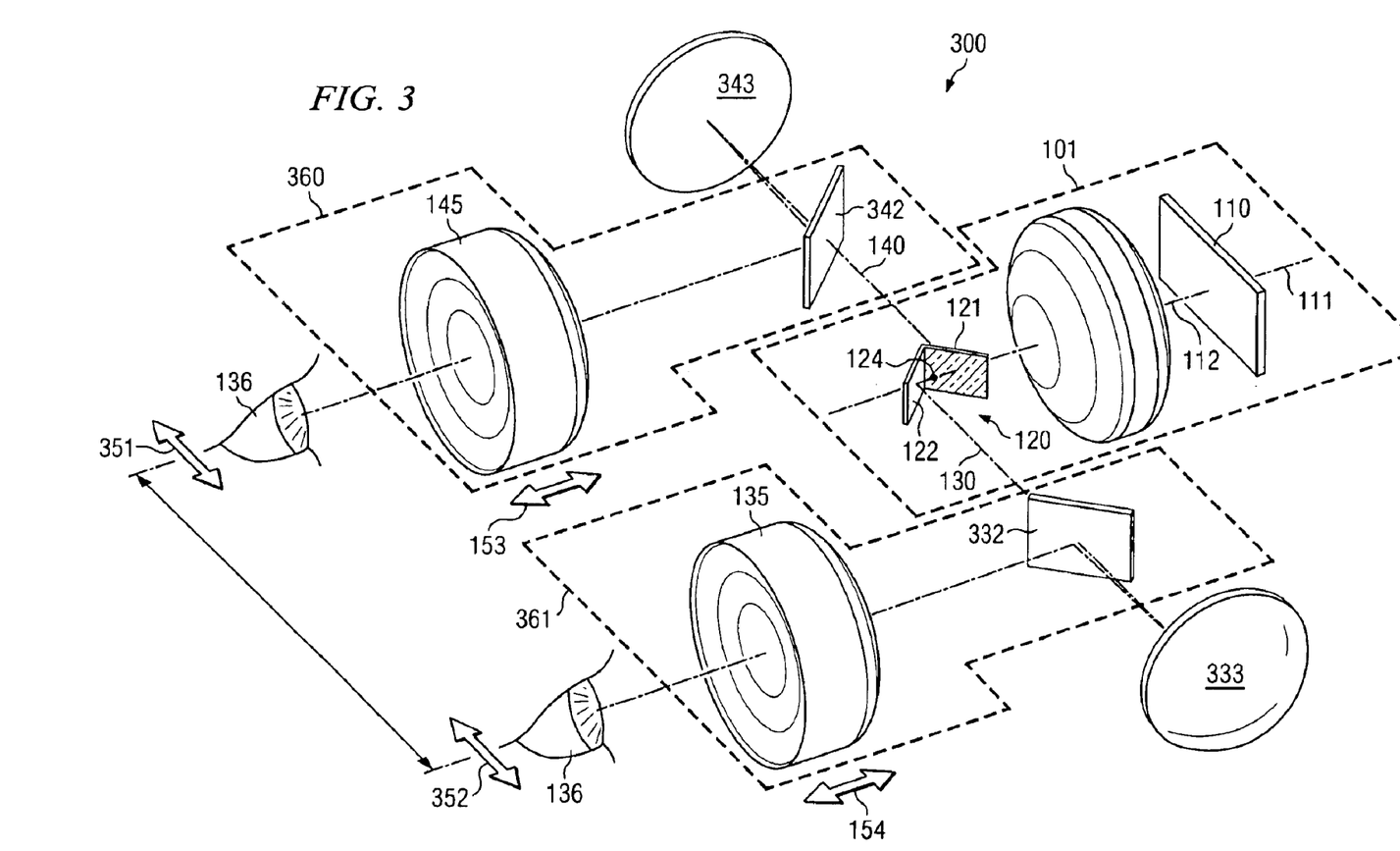
FIG. 3 illustrates a prospective view of a head mounted display arranged according to an embodiment the present invention.

FIG. 3 illustrates a prospective view of a head mounted device arranged according to an embodiment of the present invention. Head mounted device 300 includes section 101, as described in relation to FIG. 1, to split a display image of display 110 into a left-eye sub-image traveling along left-eye optical sub-path 140 and a right-eye sub-image traveling along right-eye optical sub-path 130. In the embodiment depicted in FIG. 3, a left-eye display sub-image follows left-eye optical sub-path 140 and passes through a left-eye real image reflector 342 to strike left-eye reflective diffuser 343, thus creating a real image. This real image is then reflected by left-eye real image reflector 342 into left eyepiece optics 145. Left eyepiece optics 145 adjusts a reflected real image appropriately for left-eye 146. A right-eye display sub-image will follow right-eye optical sub-path 130 passing through right-eye real-image reflector 332 to strike right-eye reflective diffuser 333, thus creating a real image. This real image is reflected by right-eye real-image reflector 332 into right eyepiece optics 135 which will adjust a reflected real-image appropriately for right-eye 136.

The embodiment depicted in FIG. 3 is described as using reflective diffusers on which real images are formed. The present invention is not limited to the use of any one type of diffuser. Rather, the embodiments may use any appropriate diffuser, as previously described, and may be any appropriate shape such as spherical, flat, or aspheric.

The embodiment in FIG. 3 is also capable of diopter correction through movement 153 of left eyepiece optics 145 and movement 154 of right eyepiece optics 135. Left-eye real-image reflector 342 and left eyepiece optics 145 collectively make up left eyepiece 360. Right-eye real-image reflector 332 and right eyepiece optics 135 collectively make up right eyepiece 361.

Device 300 is capable of IPD adjustment through multiple simultaneous movements. The embodiment of FIG. 3 simultaneously moves left eyepiece 360 and right eyepiece 361 through movements 351 and 352 respectively to set the correct IPD. At the same time, movement 153 of left eyepiece optics 145 and movement 154 of right eyepiece optics 135 are moved to maintain the optical path lengths between eyepiece optics 145, 135 and reflective diffusers 343, 333.

In device 300, left-eye real-image reflector 342 and right-eye real-image reflector 332 are partially reflective surfaces, but embodiments are not limited to the arrangement depicted. Rather, embodiments may easily be adapted to any arrangement, such as those using prisms, or polarizing beam splitters, that appropriately reflect light into eyepiece optics 135 and 145 and transmit light from optical paths 130, 140 towards reflective diffusers 333, 343, respectively.

Figure 4A:
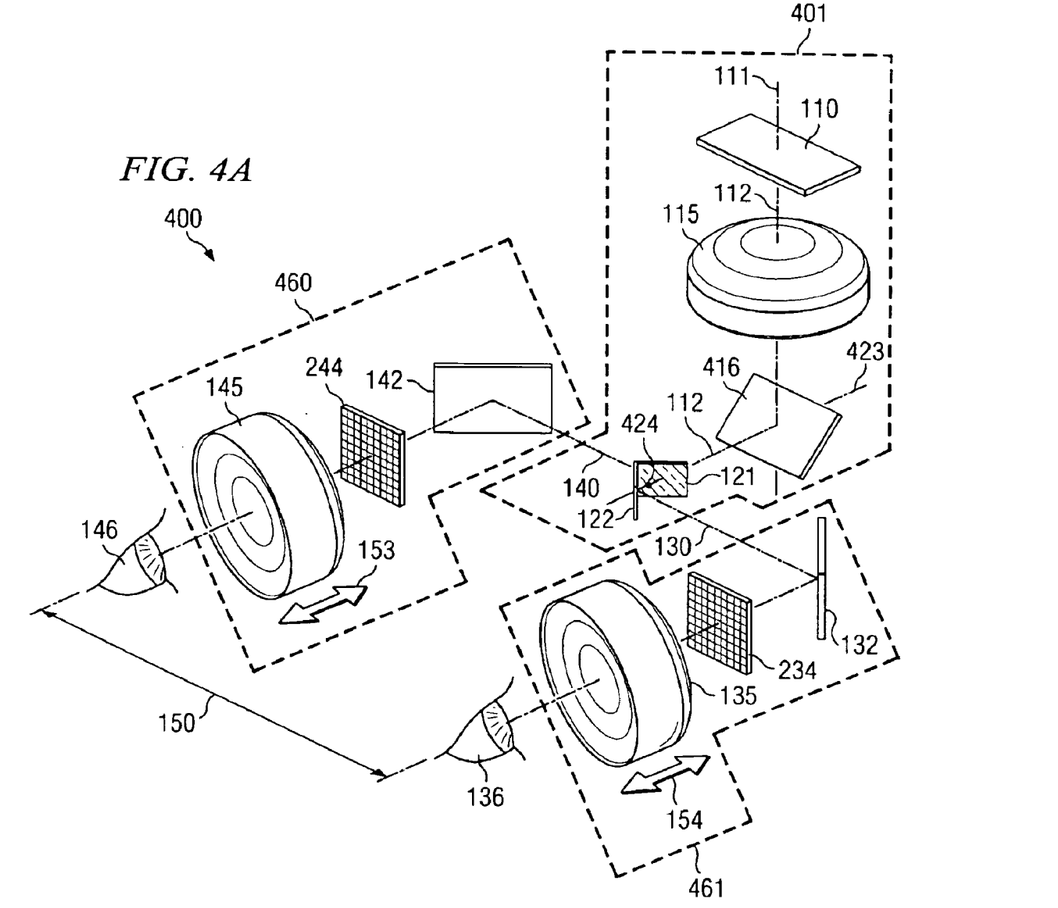
FIGS. 4A and 4B illustrate a prospective view of a head mounted display arranged according to an embodiment of the present invention.
Figure 4B:
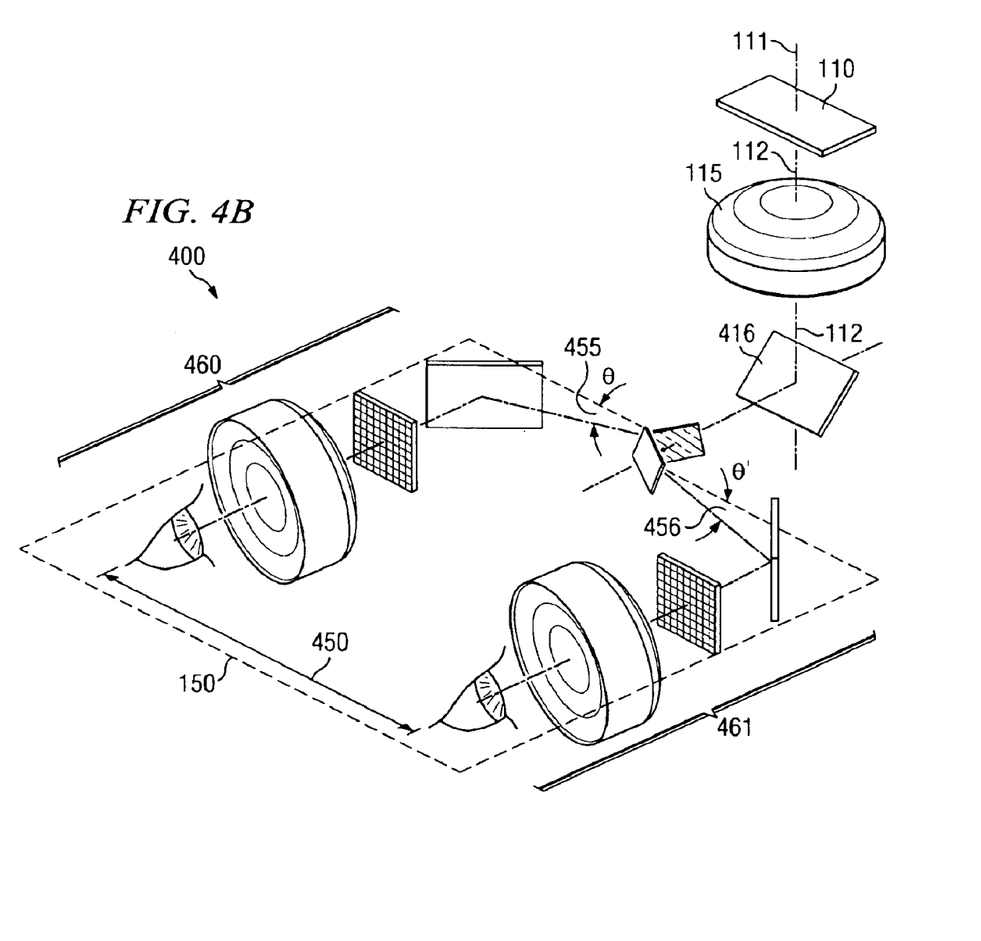

FIGS. 4A and 4B illustrate a prospective view of head mounted device 400 arranged according to an embodiment of the present invention. Head mounted device 400 uses right angle sub-image creation section 401 to create a plurality of display sub-images from a single image source. Similar to section 101 described in FIGS. 1–3, section 401 splits a display image of display 110 into left-eye sub-image traveling along left-eye optical sub-path 140 and a right-eye sub-image traveling along right-eye optical sub-path 130. In section 401, display 110 and display optics 115 are rotated 90° from section 101 of FIGS. 1 through 3. Display 110 projects a display image along optical path 112 where it is focused by display optics 115. A display image then strikes display reflector 416, which redirects the optical path 112 by 90°. Reflector 416 causes a focused display image to be directed into splitter 120. By redirecting the optical path with reflector 416, the total volume of section 401 is reduced. The volume may be further reduced by adding additional similar reflectors. In section 401, splitter 120 is arranged such that partially reflective surface 121 and fully reflective surface 122 are parallel to display axis 111, and reflected focal point 424 of the display optics 115 lies inside of splitter 120. Partially reflective surface 121 reflects a portion of a display image as a left-eye display sub-image to follow left-eye optical sub-path 140 such that it strikes left-eye reflector 142. The portion of the display image not reflected by partially reflective surface 121 is reflected by fully reflective surface 122 as a right-eye sub-image along right-eye optical sub-path 130 such that it strikes right-eye reflector 132.

Device 400 uses "real" images in a manner similar to device 200 of FIG. 2. For device 400, a left-eye display sub-image is reflected to left-eye diffuser 243, where a real image is created. This real image is then transported to left-eye 146 by left eyepiece optics 145, which is designed to appropriately focus a left-eye sub-image for viewing by left-eye 146. A right-eye display sub-image will be reflected onto right-eye diffuser 234 creating a real image, which is transported to right-eye 136 by right eyepiece optics 135, which is designed to appropriately focus a right-eye sub-image for viewing by right-eye 136. Device 400 is capable of diopter correction through movement 153 of left eyepiece optics 145 and movement 154 of right eyepiece optics 135.

FIG. 4B illustrates the IPD correction capability of device 400. In this embodiment, fully reflective surface 122 and partially reflective surface 121 are rotatable about splitter axis 423 and with respect to each other. When filly reflective surface 122 is rotated clockwise about axis 423 and partially reflective surface 121 is rotated counter-clockwise, right-eye optical sub-path 130 and left-eye optical sub-path 140 are deflected out of the plane, and are no longer 180° from each other. When right-eye optical sub-path 130 and left-eye optical sub-path 140 are deflected some angles theta ($\theta$) and theta prime ($\theta'$), the result is that device 400 has adjusted IPD 450. Eyepieces 460 and 461 rotate inward simultaneously with the rotation of surfaces 121, 122. Eyepiece 460 rotates counterclockwise to follow the downward deflection of sub-path 140, and eyepiece 461 rotates clockwise to follow the downward deflection of sub-path 130. These simultaneous rotations result in adjusted IPD 450.

Figure 5A:
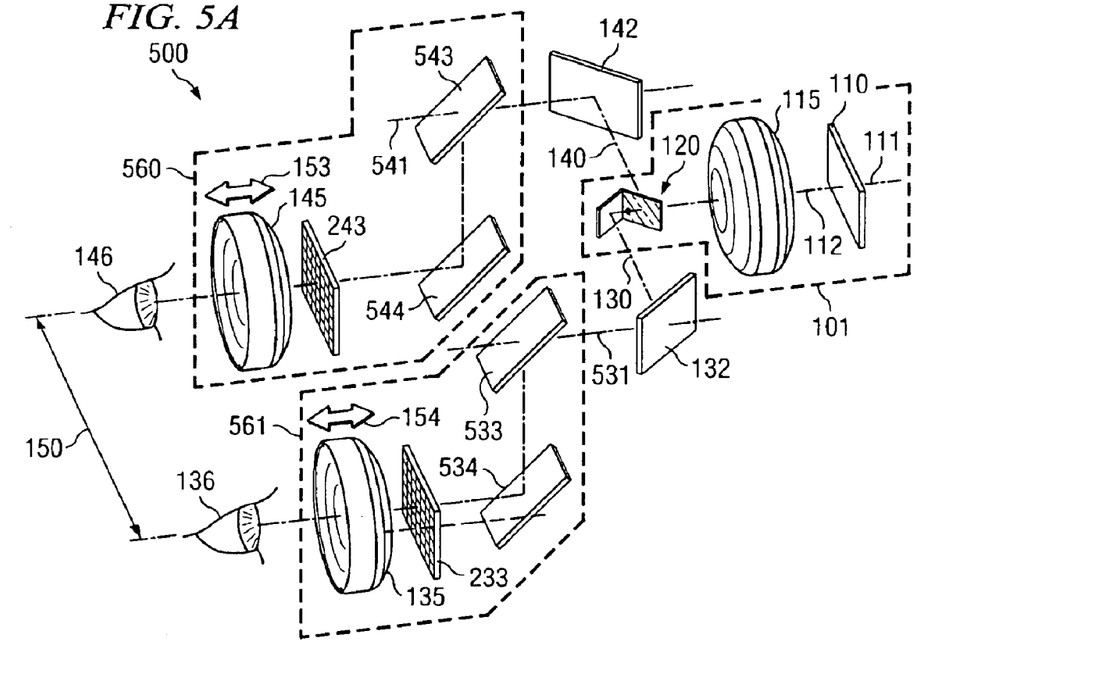
FIGS. 5A and 5B illustrate a prospective view of a head mounted display arranged according to an embodiment of the present invention.
Figure 5B:
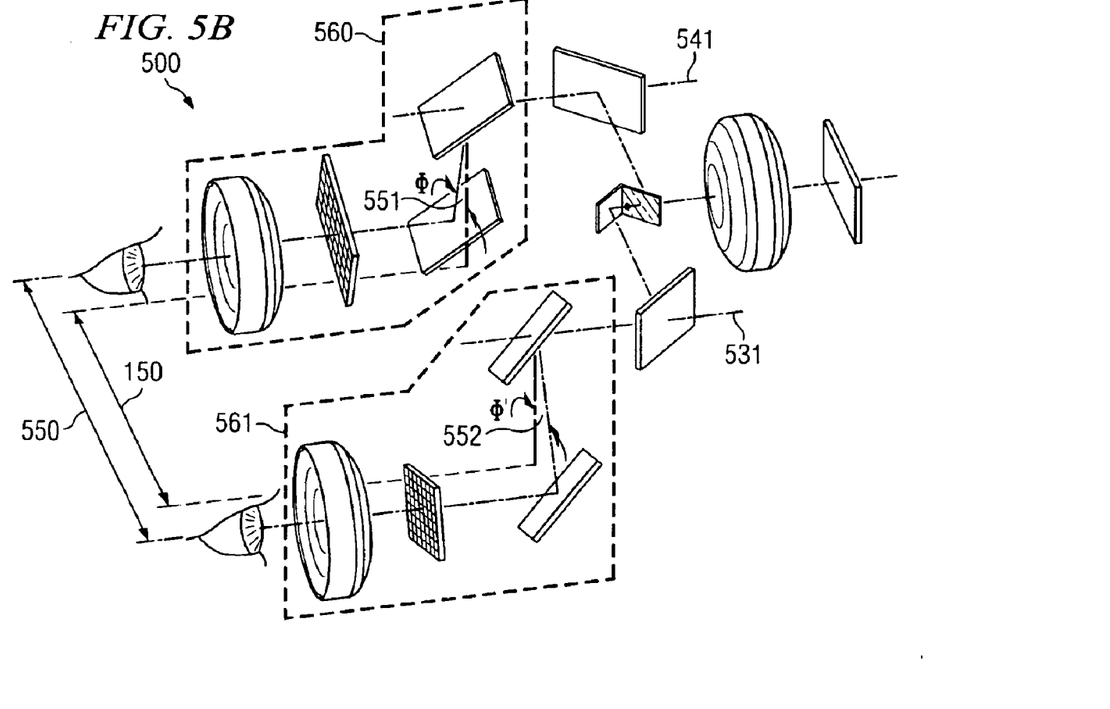

FIGS. 5A and 5B illustrate a prospective view of a head mounted display 500 arranged according to an embodiment of the present invention. For head mounted device 500, section 101 is again used to split the display image of display 110 into a left-eye sub-image traveling along left-eye optical sub-path 140 and a right-eye sub-image traveling along right-eye optical sub-path 130. For display 500, a left-eye display sub-image will strike a left-eye reflector 142 causing left-eye optical sub-path 140 to be redirected 90°. A left-eye display sub-image will then strike second left-eye reflector 543, which also causes left-eye optical sub-path 140 to be redirected 90°. Left-eye reflector 142 and second left-eye reflector 543 are arranged along a common left-eye reflector axis 541. Once a left-eye display sub-image has been reflected by the second left-eye reflector 543, it is reflected by third left left-eye reflector 544 and redirected onto left-eye diffuser 243.

Similarly, a right-eye display sub-image will strike a right-eye reflector 132 causing right-eye optical sub-path 130 to be redirected 90°. A right-eye display sub-image will then strike second right-eye reflector 533, which also causes right-eye optical sub-path 130 to be redirected 90°. Right-eye reflector 132 and second right-eye reflectors 533 are arranged along a common right-eye reflector axis 531. Once a right-eye display sub-image has been reflected by second right-eye reflector 533, it is reflected by third right-eye reflector 534 and redirected onto right-eye diffuser 233.

A real-image created on left-eye diffuser 243 is transmitted to left-eye 146 by left eyepiece optics 145. Left eyepiece 560 is made up of second left-eye reflector 543, third left-eye reflector 544, left-eye diffuser 243, and left eyepiece optics 145, collectively. A real-image created on right-eye diffuser 233 is transmitted to right-eye 136 by right eyepiece optics 135. Right eyepiece 561 is made up of second right-eye reflector 533, third right-eye reflector 534, right-eye diffuser 233, and right eyepiece optics 135, collectively. Device 500 is capable of diopter correction through movement 153 of left eyepiece optics 145 and movement 154 of right eyepiece optics 135.

Device 500 can adjust IPD 150 as depicted in FIG. 5B. In Device 500, left eyepiece 560 is rotatable about axis 541 with respect to left-eye reflector 142. When left eyepiece 560 rotates counter-clockwise about left-eye reflector axis 541, optical sub-path 140 is deflected from its previous path by some angle phi ($\phi$). Similarly, right eyepiece 561 is rotatable about axis 531 with respect to right-eye reflector 132. When right eyepiece 561 rotates clockwise about the right-eye reflector axis 531, optical sub-path 130 is deflected some angle phi prime ($\phi'$) from its previous path. These deflections result in left eyepiece 560 and right eyepiece 561 rotating in the plane of the users face to adjusted IPD 550.

Figures 6, 8:
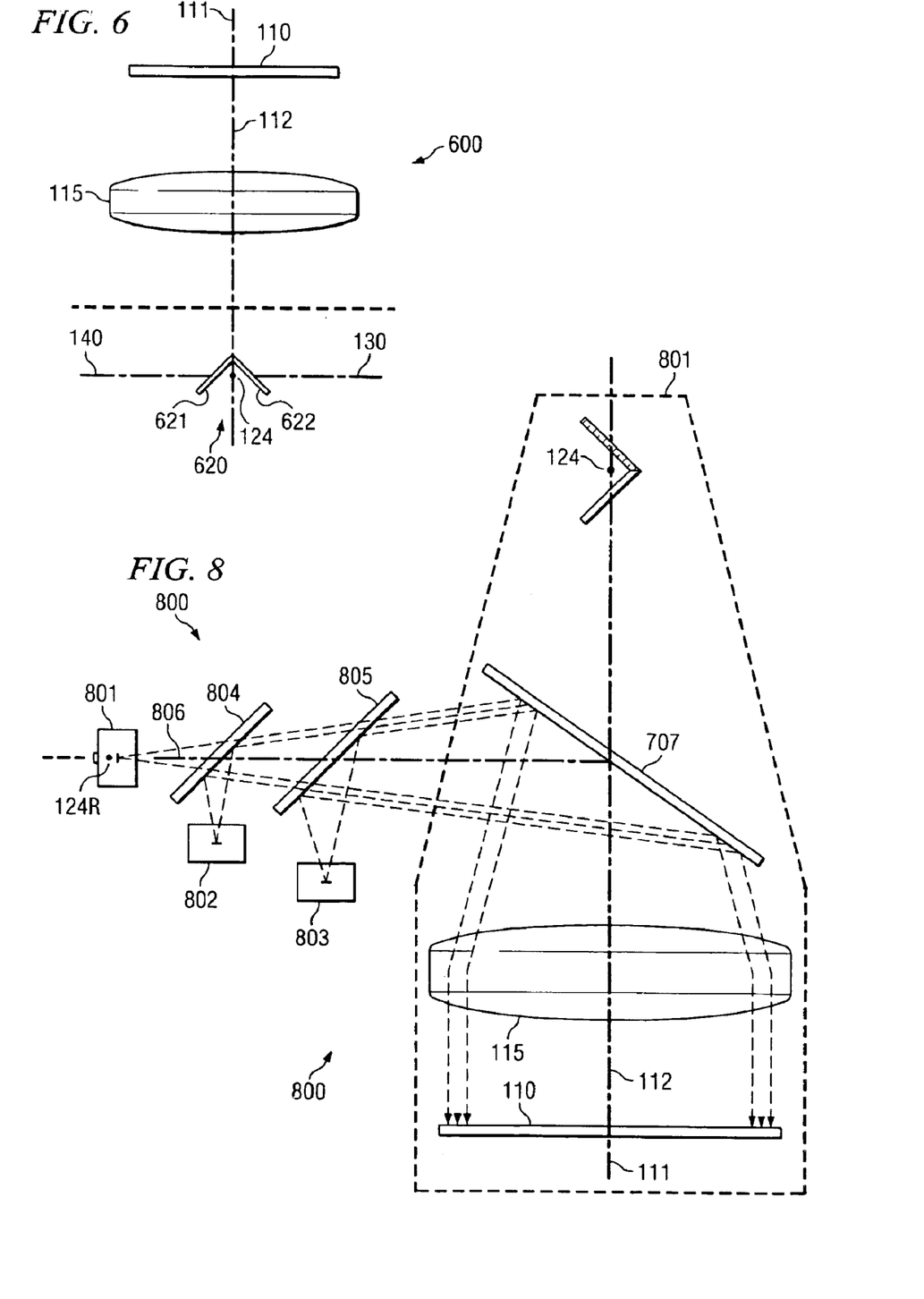
FIG. 6 illustrates a top view of a portion of a head mounted display arranged according to an embodiment of the present invention.
FIG. 8 illustrates a top view of a portion of a head mounted display arranged according to an embodiment of the present invention.

FIG. 6 illustrates a top view of a portion of a head mounted device arranged according to an embodiment of the present invention. FIGS. 1–5 have depicted embodiments using sub-image creation sections 101 and 401. However, embodiments are not limited to these arrangements. In FIG. 6, sub-image creation section 600 includes display 110 arranged normal to display axis 111. Display 110 projects a display image along optical path 112. A display image can then be focused by display lens 115 having a lens focal point 124. Splitter 620 is a symmetric V-mirror splitter composed of right fully reflective surface 622 and left fully reflective surface 621 that share a common edge and are arranged symmetrically about display axis 111. FIG. 6 has been depicted and described using fully reflective surfaces, but such arrangements may be readily adapted to the use of polarizing beam splitters or partially reflective surfaces as well. The arrangement of section 601 results in a display image projected by display 110 which is focused by display lens 115 and split into two display sub-images, one reflected along right-eye optical sub-path 130 and one along left-eye optical sub-path 140.

Further optimization of the various embodiments of the present invention can be made by the use of collimated (or approximately collimated) light. A display that (approximately) produces, reflects, or is illuminated by collimated light can improve image quality and simplifies device arrangement. There are numerous methods of producing and providing collimated light to different aspects of HMD's, and embodiments are not limited to any one.

Figure 7:
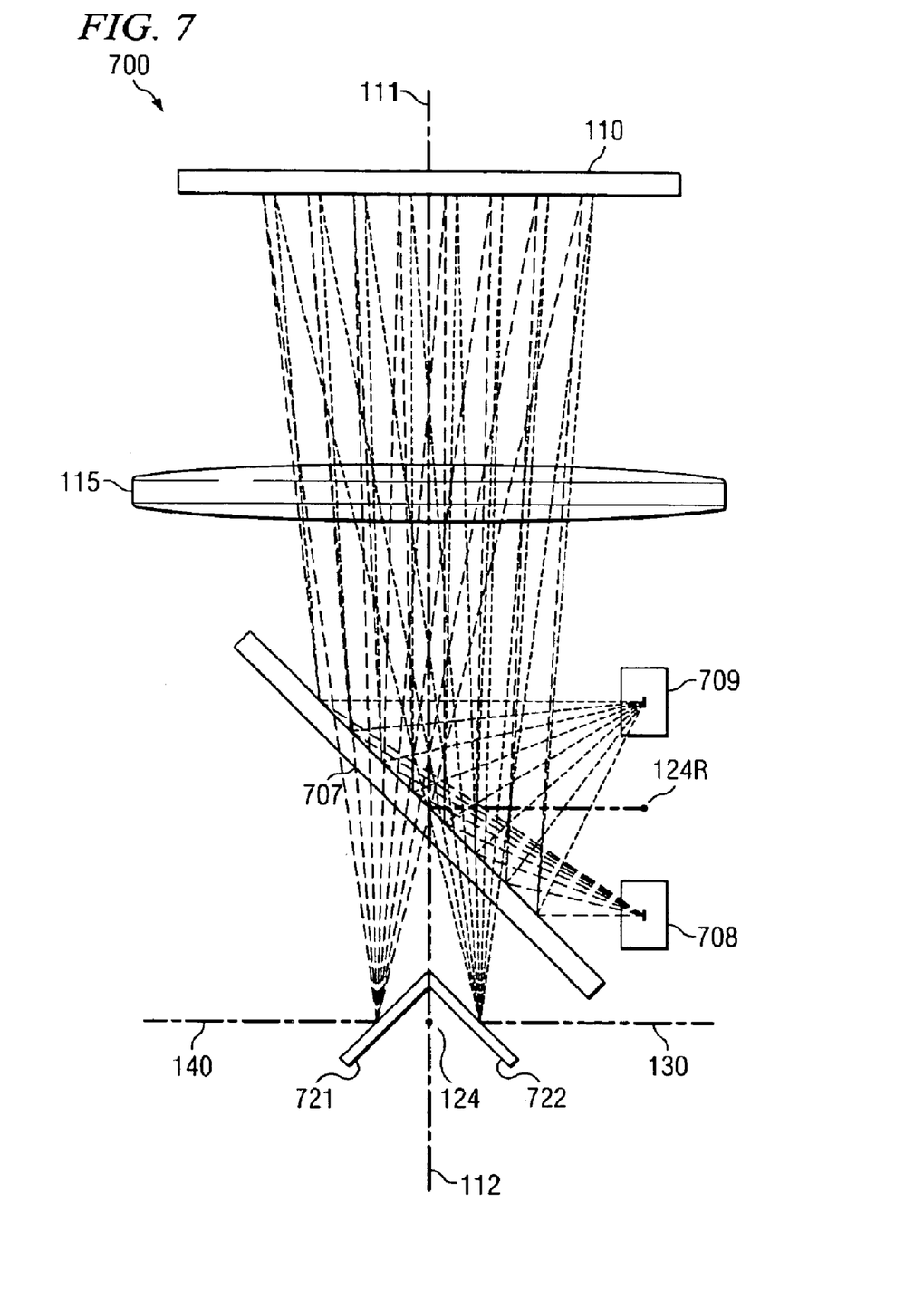
FIG. 7 illustrates a top view of a portion of a head mounted display arranged according to an embodiment of the present invention.

FIG. 7 illustrates a top view of a portion of a head mounted device arranged according to the present invention. In sub-image creation section 700, display 110 is arranged normal to display axis 111. Display lens 115 is interposed between display 110 and splitter 620. Splitter 620 is arranged as a symmetric V mirror splitter with fully reflective surface 621 and fully reflective surface 722. Focal point 124 of lens 115 is proximate to splitter 620. Display 110 is illuminated by light sources 708 and 709 which are reflected by source reflector 707, which may be a polarization splitter, or a partially reflective mirror, or other appropriate reflector. Sources 708 and 709 are arranged adjacent to display axis 111 and in a plane with reflected focal point 124R. The sub-image created by source 708 and display 110 will be focused by lens 115 and incident upon reflective surface 722 of splitter 620. When display 110 is illuminated by source 709, a separate display sub-image is created and focused by lens 115. Because source 709 is positioned below reflected focal point 124R, the sub-image created by source 709 and display 110 will be focused by lens 115 and incident upon reflective surface 621 of splitter 620.

In the embodiment of FIG. 7, two complete and independent images (referred to again as sub-images) of display 110 are created, and each sub-image is a full image of display 110. In the embodiment of FIG. 7, splitter 620 does not split a single image to create sub-images, but rather splits the angular space of the display reflection allowing the independently created images to be redirected along separate paths.

FIG. 8 illustrates a top view of a portion of a head mounted device 800 arranged according to an embodiment of the present invention using sub-image creation section 101. Blue source light 801 is arranged along the source light optical path 806, preferably in a position at or near reflective focal point 124R of display optics 115. Blue source light 801 may be any light source capable of producing blue light, such as Nichia NSCx100 series light emitting diode (LED). Light from blue source 801 passes through a first color filter 804 arranged at an appropriate angle to the optical path and selected in order to pass blue light and to reflect green light. Green source 802 is placed adjacent to source light optical path 806 and arranged in order to reflect light off of first color filter 804 in a way that simulates placing green source 802 in the same location as blue source 801. Blue light and the reflected green light follow source light optical path 806 passing through second color filter 805 arranged at an appropriate angle to source light optical path 806.

Second color filter 805 is selected such that it passes blue and green light, but reflects red light. Red source 803 is placed adjacent to source light optical path 806 and arranged in order to reflect light of second color filter 805 in a way that simulates placing red source 803 in the same location as blue source 801. Blue light, reflected green light, and reflected red light then follows source light optical path 806 and is reflected by source light reflector 807. In the depicted embodiment, source light reflector 807 can be a polarizing reflector arranged about display axis 111 and along optical path 112. The combined blue, green, and red light is polarized and reflected off of source light reflector 807, through display optics 115. In the depicted embodiment, display optics 115 is a lens selected to have a focal point of 124 (and a reflected focal point 124R). When passed through display optics 115, the combined blue, green, and red light is collimated and illuminates display 110. FIG. 8 depicts the illumination of display 110 from a single direction, but the embodiments are not limited to a single direction. Rather, the illumination system of FIG. 8 can be easily adapted for multiple direction illumination as in FIG. 7.

The embodiments of the present invention are not limited to arrangements that place an image splitter proximate to the focal point of a focusing optic. Rather, embodiments of the present invention are able to reduce the splitting volume of various applications, by positioning the image splitter to split a display image focused in a small area.

Figure 9:
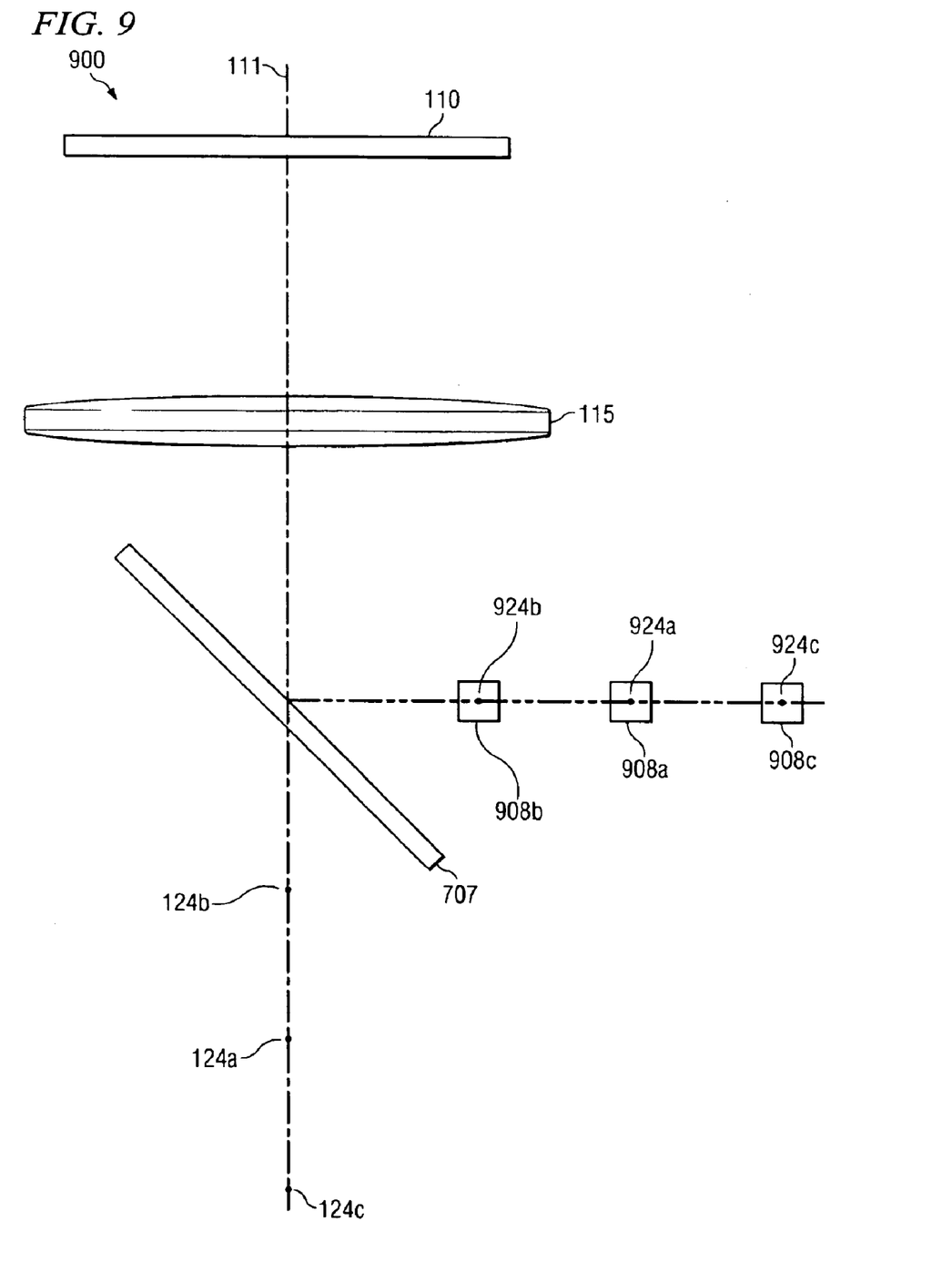
FIG. 9 illustrates a top view of a portion of a head mounted display arranged according to an embodiment of the present invention.

FIG. 9 illustrates the reduced splitting volume created by embodiments of the present invention. In FIG. 9, display 110 is illuminated, thus creating a display image. The display image propagates along optical path 112 arranged along display axis 111. Display lens 115, having a display lens focal point 124a, focuses the display image in order to provide a reduced splitting volume. The point where the splitting volume is smallest will depend on the light illuminating the display.

When display 110 is illuminated by source 908a positioned at reflective display lens focal point 924a, display lens 115 will collimate the light reflected from source reflector 707. This results in a display image that is focused by display lens 115 to approximately display lens focal point 124a. When display 110 is illuminated by source 908b positioned at point 924b which is closer to display axis 111, the light reflected from source 707 will be divergent as it strikes display 110. Thus, the display image will be focused to approximately point 124c. When display 110 is illuminated by source 908c, positioned at a point 924c which is farther away from display axis 111, the light reflected from source reflector 707 will be convergent as it strikes display 110. Thus, the display image will be focused to approximately point 124b. Embodiments of the present invention can thus be arranged to split the display image at whichever point is most appropriate.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for transporting images from a single video display to both eyes of a user, said method comprising:

focusing an image of said display to reduce a volume of space needed for splitting said image; and splitting said image in said reduced volume.

2. The method of claim 1 wherein a lens focuses said image of said display.

3. The method of claim 2 wherein said lens is made of glass.

4. The method of claim 2 wherein said lens is proximate to said display.

5. A head mounted device for transporting images of a single video display to both eyes of a user, said device comprising:

optics for reducing a size of an image of said display to a reduced volume of space; and means for splitting said reduced-size image, wherein said splitting means is arranged within said reduced volume.

6. The device of claim 5 wherein said optics is a lens.

7. The device of claim 5 wherein said splitting means comprises a partially reflective surface and a fully reflective surface.

8. The device of claim 5 wherein said splitting means comprises:

a first fully reflective surface and a second fully reflective surface arranged as a symmetric V mirror.

9. The device of claim 5 wherein said optics is a lens in proximity to said display.

10. The device of claim 9 wherein said lens is arranged to collimate light illuminating said display.

11. A method of channeling a displayed image, said method comprising:

projecting said displayed image along an optical path;

positioning a lens to focus the displayed image to a point on the optical path; and splitting the displayed image, proximate to said point, into a plurality of sub-images, each sub-image following one of a plurality of optical sub-paths.

12. The method of claim 11 wherein said point is the focal point of said lens.

13. The method of claim 11 further comprising:

positioning at least one reflector along the optical path whereby the distance between said lens and said point is reduced.

14. The method of claim 11 further comprising:
splitting the displayed image with a plurality of reflective surfaces arranged about a display axis.

15. The method of claim 14 wherein a rotation of said reflective surfaces may be used to adjust for an inter pupillar distance.

16. The method of claim 11 further comprising:
forming a real image on a diffuser along at least one of the plurality of optical sub-paths.

17. The method of claim 16 wherein a movement of said diffuser may be used to adjust for an inter pupillar distance.

18. The method of claim 11 further comprising:
redirecting the optical sub-path with a first reflector along at least one of the plurality of optical sub-paths.

19. The method of claim 18 wherein a movement of said first reflector may be used to adjust for an inter pupillar distance.

20. The method of claim 18 wherein said optical sub-path is redirected by a second reflector, wherein said second reflector is rotatable, and wherein said rotation may be used to adjust for an inter pupillar distance.

21. The method of claim 11 further comprising:
illuminating a display with a broad-band radiation source.

22. The method of claim 21 wherein the broad-band radiation source is comprised of a plurality of narrow-band radiation sources projecting radiation along a common source path.

23. The method of claim 22 further comprising:
using color filters to simulate a source location.

24. The method of claim 21 wherein said lens collimates said illumination.

25. A device for channeling a displayed image, said device comprising:
means for projecting an image along an optical path;
means for focusing said image;
means proximate to a focal point of said image for splitting said image into a plurality of display sub-images, each said sub-image following one of a plurality of optical sub-paths; and
wherein said focusing means is interposed between the said projecting means and said splitting means.

26. The device of claim 25 wherein said splitting means comprises a plurality of means for reflecting the image.

27. The device of claim 25 wherein the splitting means comprises:
means for partially reflecting the image; and
means for fully reflecting the image.

28. The device of claim 27 wherein the means for partially reflecting the image and the means for fully reflecting the image are perpendicular to each other.

29. The device of claim 27 wherein the means for partially reflecting the image and the means for fully reflecting the image are arranged asymmetrically about a display axis.

30. The device of claim 27 wherein the means for partially reflecting the image and the means for fully reflecting the image are rotatable and wherein said rotation may be used to adjust for an inter pupillar distance.

31. A method for channeling a displayed image, said method comprising:
projecting an image of a display along an optical path;
splitting said image into a plurality of display sub-images, each sub-image following one of a plurality of optical sub-paths; and
focusing said image with a focusing element wherein said projected image is focused to a location proximate to the point where said image is split.

32. The method of claim 31 wherein said image is projected via predominately collimated light and said location is approximately the focal point of said focusing element.

33. The method of claim 31 wherein said image is projected via predominately convergent light, and said location lies between said display and the focal point of said focusing element.

34. The method of claim 31 wherein said image is projected via predominately divergent light, and the focal point of said focusing element lies between said display and said location.

35. The method of claim 31 wherein said projected image is the reflected image of said display when said display is illuminated by light collimated by said focusing element.

36. A system for channeling a displayed image, said system comprising:
a display that projects an image along an optical path;
a lens that focuses the image;
a splitter in proximity to a focal point of said image for creating a plurality of display sub-images, each said sub-image following one of a plurality of optical sub-paths; and
means for forming a real image along at least one of the plurality of said optical sub-paths.

37. The system of claim 36 wherein a movement of said forming means may be used to adjust for inter pupillar distance.

38. The system of claim 36 wherein said forming means is a spherical diffuser.

39. The system of claim 36 wherein said forming means is a diffraction grating.

40. The system of claim 36 wherein said forming means is a microlens array.

41. A system for channeling a displayed image, said system comprising:
a display that projects an image along an optical path;
a lens that focuses the image;
a splitter, in proximity to the focal point of said image for creating a plurality of display sub-images, each said sub-image following one of a plurality of optical sub-paths; and
a first means for redirecting at least one of said plurality of optical sub-paths.

42. The system of claim 41 wherein said first redirecting means is a mirror.

43. The system of claim 41 wherein a movement of said first redirecting means may be used to adjust for inter pupillar distance.

44. The system of claim 43 wherein a second redirecting means is rotatable about an axis common to the first and second redirecting means and wherein said rotation may be used to adjust for inter pupillar distance.

45. A head mounted display, said head mounted display comprising:
a display screen operable to produce a display image along an optical path;
display optics, proximate to said display screen, wherein said optics focus said image to a point; and
a splitter, located proximate to said point, for splitting the display image into a plurality of display sub-images, each sub-image traveling along one of a plurality of optical sub-paths.

46. The head mounted display of claim 45 wherein said splitter comprises a partially reflective surface and a fully reflective surface arranged as an asymmetric V-mirror splitter.

47. The head mounted display of claim 45 further comprising:
a diffuser to form a real image along at least one of the plurality of optical sub-paths.

48. The head mounted display of claim 47 wherein said diffuser is spherical.

49. The head mounted display of claim 45 wherein said display screen, said optics, and said splitter are arranged as a fixed section that moves, synchronous with at least one eyepiece, to adjust to a user's interpupillary distance.

50. A head mounted, said head mounted display comprising:
a display screen operable to produce an image along an optical path;
display optics, proximate to said display screen, wherein said optics focus said image to a point;
a splitter, located proximate to said point, for splitting the display image into a plurality of display sub-images, each sub-image traveling along one of a plurality of optical sub-paths; and
a first reflector arranged along at least one of the plurality of optical sub-paths.

51. The head mounted display of claim 50 further comprising:
a diffuser interposed between the reflector and eye optics.

52. The head mounted display of claim 50 wherein said reflector is moveable.

53. The head mounted display of claim 50 further comprising:
a second reflector arranged along said at least one of the plurality of optical sub-paths to redirect the at least one of the plurality of the optical sub-paths.

54. The bead mounted display of claim 53 wherein the second reflector is rotatable about an axis common to the first and second reflectors and wherein said rotation can adjust for a user's interpupillary distance.

55. A system for channeling a displayed image, said system comprising:
a display operable to produce said displayed image along an optical path;
display optics proximate to the display, said display optics having a focal point;
a broad-band source projecting radiation onto said display; and
a splitter located proximate to the focal point, said splitter operable for splitting the displayed image into a plurality of display sub-images, each sub-image traveling along one of a plurality of optical sub-paths.

56. The system of claim 55 wherein the broad-band source is comprised of a plurality of narrow-band sources arranged to simulate a single broad-band source.

57. The system of claim 55 wherein said broad band source comprises:
a first and a second filter;
a first, a second, and a third narrow-band projectors;
wherein said first narrow-band projector is positioned to project radiation through said first filter and along a common source path;
wherein said second narrow-band projector is positioned to project radiation onto said first filter, and wherein said first filter is positioned to reflect said radiation from said second narrow-band projector through said second filter and onto said common source path; and
wherein said third narrow-band projector is positioned to project radiation onto said second filter, and said second filter is positioned to reflect radiation from said third projector onto said common source path.

58. The system of claim 57 wherein each of said first, second, and third narrow-band projectors projects visible light of wavelengths corresponding to one of red, green, or blue.

59. A system for channeling a displayed image, said system comprising:
a sub-image creation section wherein an image of a display is focused and used to generate at least two sub-images, each directed along one of two sub-paths;
at least one eyepiece section interposed along each of said sub-paths; and
wherein said sub-image creation section and said eyepiece section adjust for interpupillary distance via synchronized movements.

60. The system of claim 59 wherein said synchronized movements maintain a constant length for each sub-path.

61. The system of claim 59 wherein said eyepiece section movement is in a direction perpendicular to the movement of said sub-image creation section.

* * * * *